(12) United States Patent
Shih et al.

(10) Patent No.: US 6,781,825 B2
(45) Date of Patent: Aug. 24, 2004

(54) BUMPER

(75) Inventors: Jr-Teng Shih, Taoyuan (TW); Chen-Sheng Fang, Taichung (TW)

(73) Assignee: Quanta Computer, Inc., Taoyuan (TW)

( * ) Notice: Subject to any disclaimer, the term of this patent is extended or adjusted under 35 U.S.C. 154(b) by 63 days.

(21) Appl. No.: 10/282,682

(22) Filed: Oct. 29, 2002

(65) Prior Publication Data

US 2004/0027796 A1 Feb. 12, 2004

(30) Foreign Application Priority Data

Aug. 7, 2002 (TW) ........................................ 91117747 A

(51) Int. Cl.[7] .............................................. H05K 5/00
(52) U.S. Cl. .................. 361/683; 312/223.1; 312/223.2
(58) Field of Search ................................. 361/681, 682, 361/683, 686, 679; 312/294, 223.1, 223.2; 345/156, 173, 179, 905

(56) References Cited

U.S. PATENT DOCUMENTS

| 5,002,184 | A | * | 3/1991 | Lloyd | .......................... 206/305 |
| 5,568,357 | A | * | 10/1996 | Kochis et al. | ............... 361/681 |
| 6,028,765 | A | * | 2/2000 | Swindler et al. | ............. 361/683 |
| 6,101,087 | A | * | 8/2000 | Sutton et al. | ................ 361/686 |
| 6,144,552 | A | * | 11/2000 | Whitcher et al. | ........... 361/681 |
| 6,532,152 | B1 | * | 3/2003 | White et al. | ................. 361/692 |
| 6,560,092 | B2 | * | 5/2003 | Itou et al. | .................... 361/681 |
| 2002/0085342 | A1 | * | 7/2002 | Chen et al. | .................. 361/683 |

* cited by examiner

Primary Examiner—Dean A. Reichard
Assistant Examiner—Carmelo Oliva
(74) Attorney, Agent, or Firm—Thomas, Kayden, Horstemeyer & Risley

(57) ABSTRACT

A bumper for protecting a portable computer. The bumper includes a main body, a first reinforcement portion, a second reinforcement portion, a third reinforcement portion and a fourth reinforcement portion. The first, second, third and fourth reinforcement portions are formed with polypropylene (PP) and covered by the main body. The main body is made of rubber. The main body and the first, second, third and fourth reinforcement portions are formed integrally. The portable computer is fixed to the main body by a plurality of bolts or screws. In addition, the first portion serves as a handle such that a user can easily carry the portable computer in combination with the bumper.

16 Claims, 5 Drawing Sheets

BUMPER

BACKGROUND OF THE INVENTION

1. Field of the Invention

The present invention relates to a bumper, and in particular to a bumper for protecting a portable computer from impact damage.

2. Description of the Related Art

Generally speaking, the outer casing of a portable computer is made of plastic material. The outer casing and inner components of the portable computer are easily damaged due to external impact.

Thus, there is a clear need for a shock-absorbing protective element that can be integrated into outer structure of a portable computer.

SUMMARY OF THE INVENTION

An object of the invention is to provide a bumper for protecting a portable computer. The bumper comprises a main body, a first reinforcement portion, a second reinforcement portion, a third reinforcement portion and a fourth reinforcement portion. The first, second, third and fourth reinforcement portions are polypropylene (PP) and covered by the main body, made of rubber. The main body and the first, second, third and fourth reinforcement portions are formed integrally. The portable computer is fixed to the rubber main body by a plurality of bolts or screws. In addition, the first portion serves as a handle such that a user can easily carry the portable computer.

The main body is formed integrally by a resilient material and has a first portion, a second portion, a third portion and a fourth portion. The first portion is connected to the second portion, the second portion is connected to the third portion, the third portion is connected to the fourth portion, and the fourth portion is connected to the first portion. The first reinforcement portion is disposed in the first portion, the connecting portion between the first portion and the second portion and the connecting portion between the first portion and the fourth portion. The second reinforcement portion is disposed in the third portion. The third reinforcement portion is disposed in the connecting portion between second portion and the third portion. The fourth reinforcement portion is disposed in the connecting portion between third portion and the fourth portion.

Preferably, the first portion, the second portion, the third portion and the fourth portion are made of a rigid material.

Preferably, the first reinforcement portion is inlaid in the first portion, the connecting portion between the first portion and the second portion and the connecting portion between the first portion and the fourth portion.

Preferably, the second reinforcement portion is inlaid in the third portion.

Preferably, the third reinforcement portion is inlaid in the connecting portion between second portion and the third portion.

Preferably, the fourth reinforcement portion is inlaid in the connecting portion between third portion and the fourth portion.

Preferably, the main body further comprises a fixing portion formed on the third portion for fixing the main body to the portable computer.

Preferably, the main body further comprises a groove formed on the first portion, the second portion, the third portion and the fourth portion for engaging the portable computer.

Preferably, the main body further comprises an inner vacancy formed in the first portion, the second portion, the third portion and the fourth portion for enhancing shockproof effect of the main body.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 4:
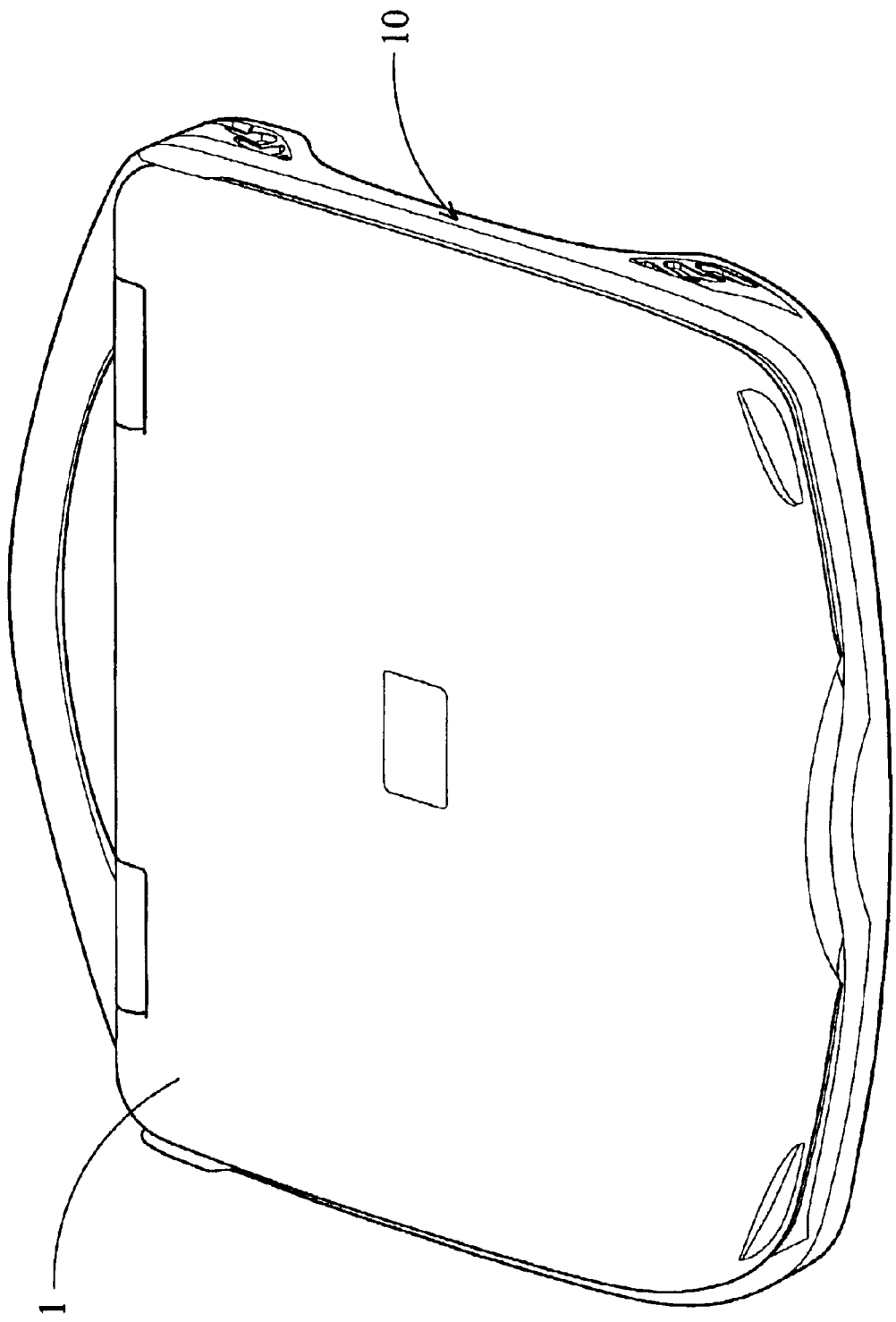
FIG. 4 is a perspective view showing the present bumper in combination with a portable computer.

Referring to FIG. 4, in order to protect a portable computer 1, such as a laptop, from impact damage, a bumper 10 is used to surround the portable computer 1. Meanwhile, in the bumper 10, some portions corresponding to the weakest portions of the portable computer 1, such as four corners of the portable computer 1, are strengthened. Thus, the bumper 10 of the invention provides the portable computer 1 with excellent shockproof capability.

Figure 1:
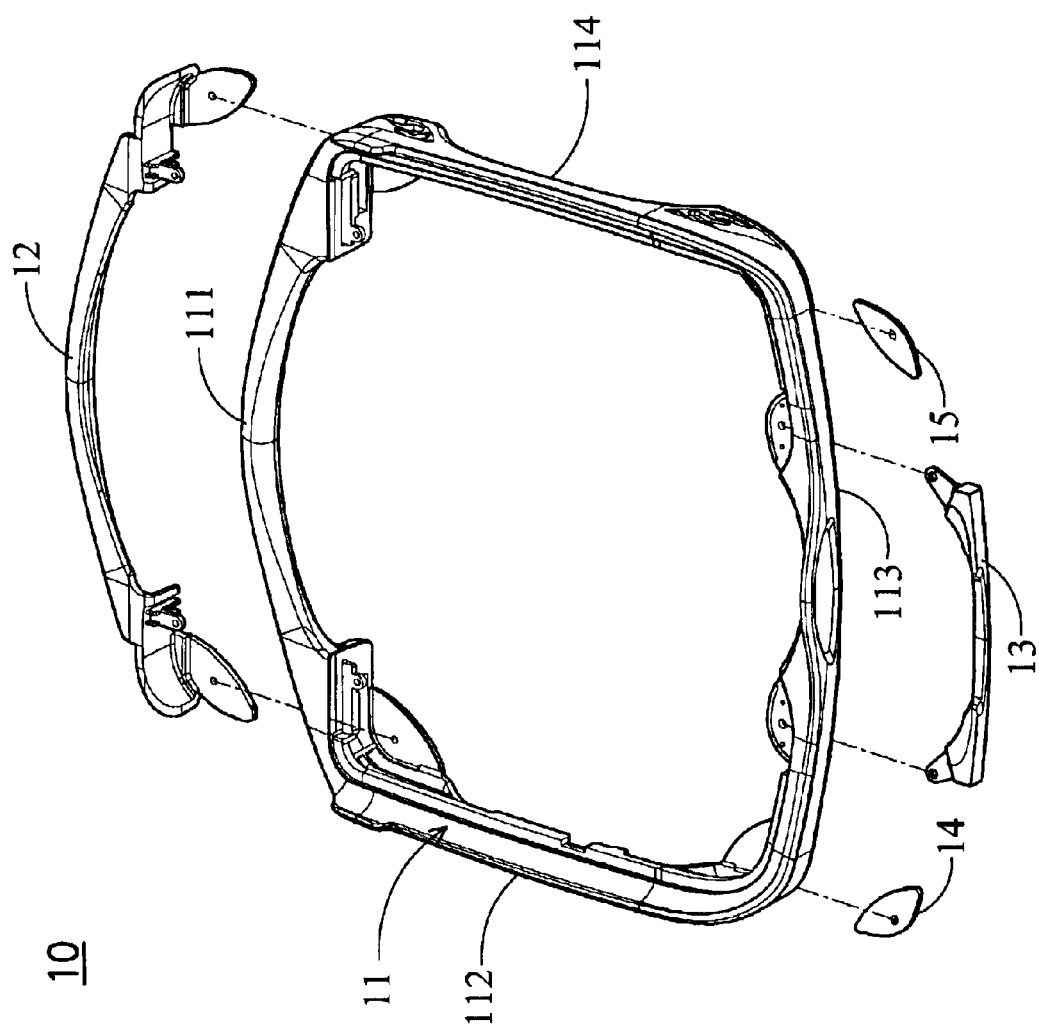
FIG. 1 is a perspective exploded view showing the bumper of the invention.

Referring to FIG. 1, the present bumper 10 comprises a main body 11, a first reinforcement portion 12, a second reinforcement portion 13, a third reinforcement portion 14 and a fourth reinforcement portion 15. Additionally, the first reinforcement portion 12 has a handle structure.

The body 11 is made of rubber and formed integrally into an annular structure. The main body 11 has a first portion 111, a second portion 112, a third portion 113 and a fourth portion 114. The first portion 111 is connected to the second portion 112. The second portion 112 is connected to the third portion 113. The third portion 113 is connected to the fourth portion 114. The fourth portion 114 is connected to the first portion 111. Additionally, a groove (not shown) is formed on inner edges of the first portion 111, the second portion 112, the third portion 113 and the fourth portion 114. The portable computer 1 is engaged with the main body 11 by the groove. Thus, the main body 11 of the bumper 10 provides the portable computer 1 with excellent shockproof capability. Also, the bumper 10 provides the portable computer 1 with good water resistance because of sealed engagement between the groove and the main body 11. Furthermore, the assembly of the bumper 10 and the portable computer 1 is simple and fast.

Figure 2:
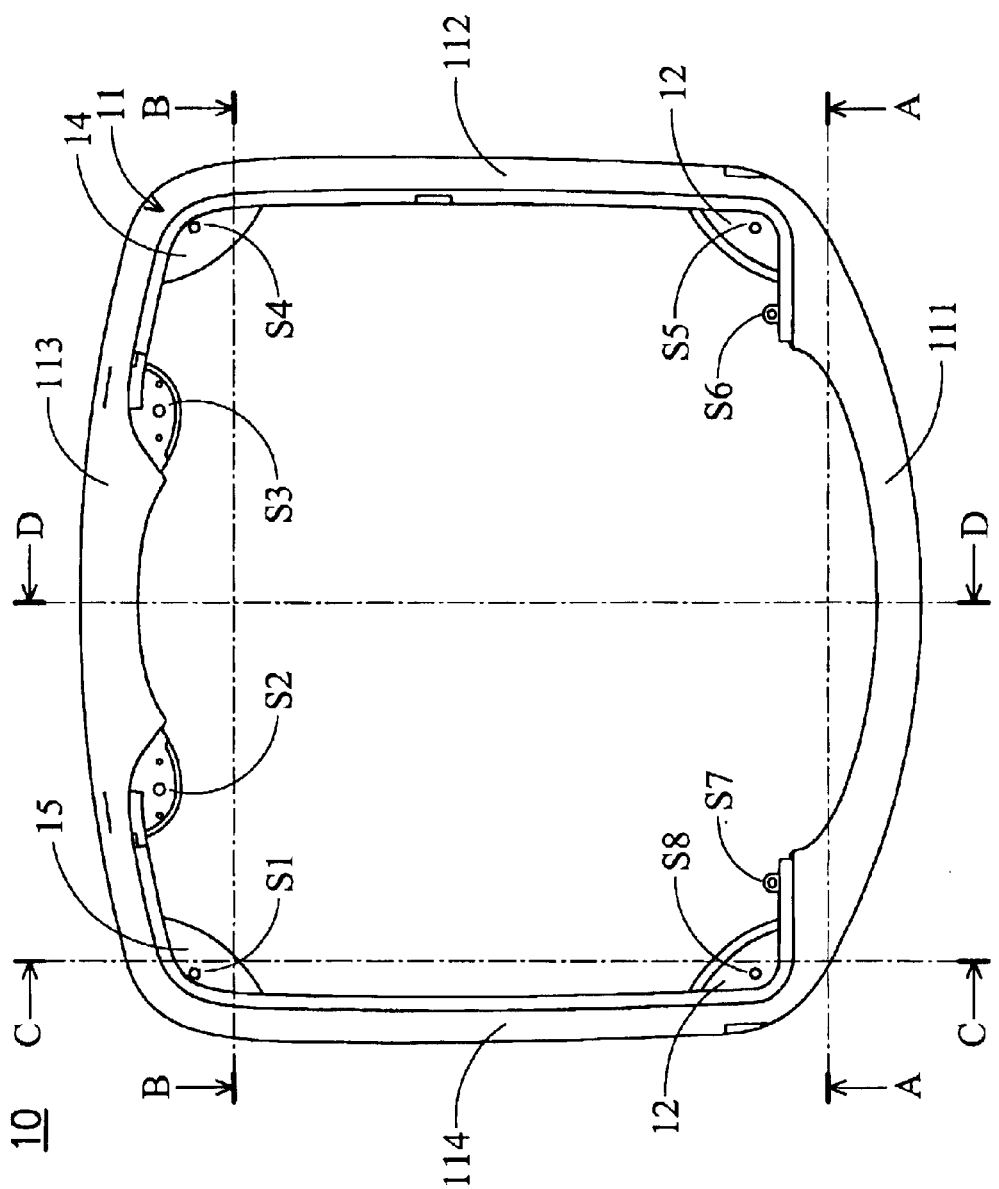
FIG. 2 is a top view of the bumper of the invention.

As mentioned above, the first portion 111 of the main body 11 is a handle. A user can carry the bumper 10 in combination with the portable computer 1 by the handle. In addition, a plurality of fixing portions S1, S2, S3, S4, S5, S6, S7 and S8 are formed on the main body 11 for fixing the main body 11 to the portable computer 1, as shown in FIG. 2.

As described above, some portions of the bumper 10 are strengthened to particularly protect the weakest portions of the portable computer 1 or the portions frequently subjected to impact. Thus, the first reinforcement portion 12 is inlaid in the first portion 111, the connecting portion between the first portion 111 and the second portion 112 and the connecting portion between the first portion 111 and the fourth portion 114. The second reinforcement portion 13 is inlaid in the third portion 113. The third reinforcement portion 14 is inlaid in the connecting portion between second portion 112 and the third portion 113. The fourth reinforcement portion 15 is inlaid in the connecting portion between third portion 113 and the fourth portion 114.

The first reinforcement portion 12, second reinforcement portion 13, third reinforcement portion 14 and fourth reinforcement portion 15 are made of materials having rigidity and toughness, such as polypropylene.

Referring to FIG. 3A, FIG. 3B, FIG. 3C and FIG. 3D, the symbol PP denotes the polypropylene material of the first reinforcement portion 12, second reinforcement portion 13, third reinforcement portion 14 and fourth reinforcement portion 15.

Figure 3A:
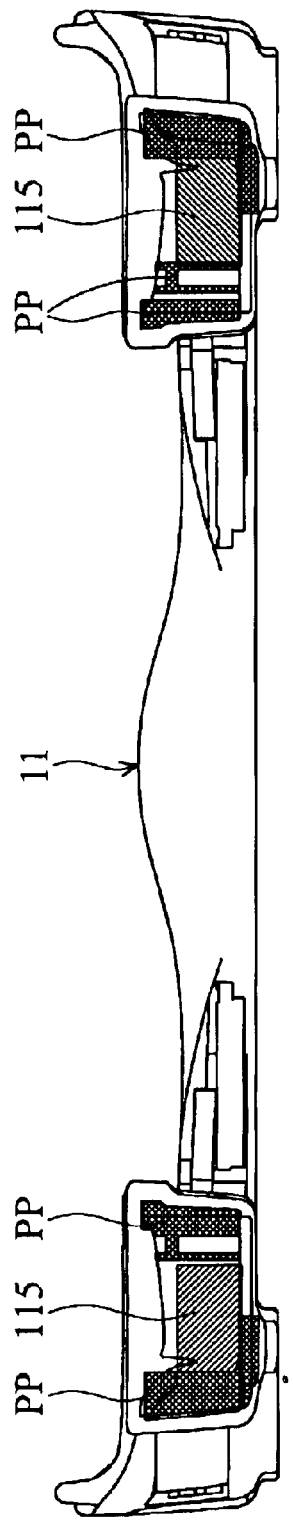
FIG. 3A is a cross section taken along line A–A of FIG. 2.
Figure 3B:
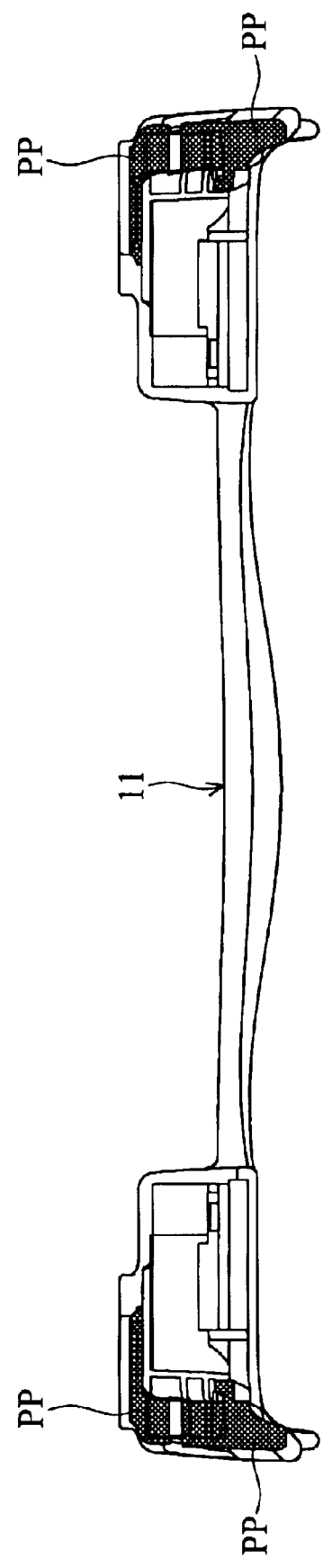
FIG. 3B is a cross section taken along line B–B of FIG. 2.
Figure 3C:
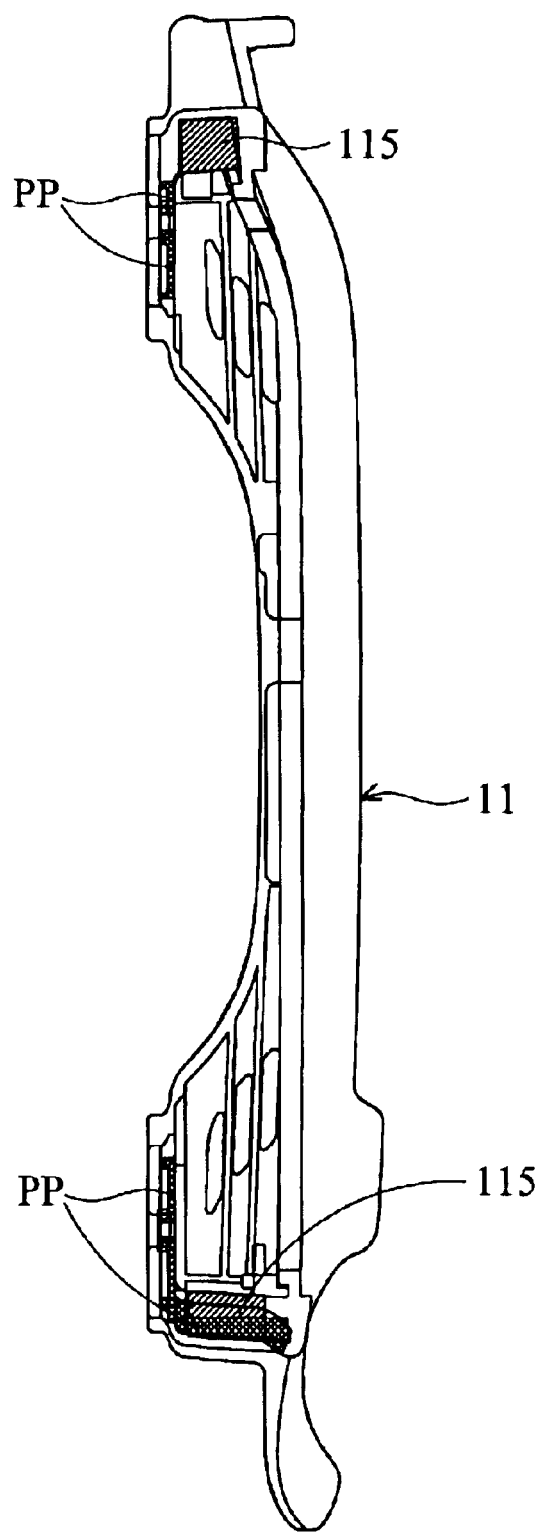
FIG. 3C is a cross section taken along line C–C of FIG. 2.
Figure 3D:
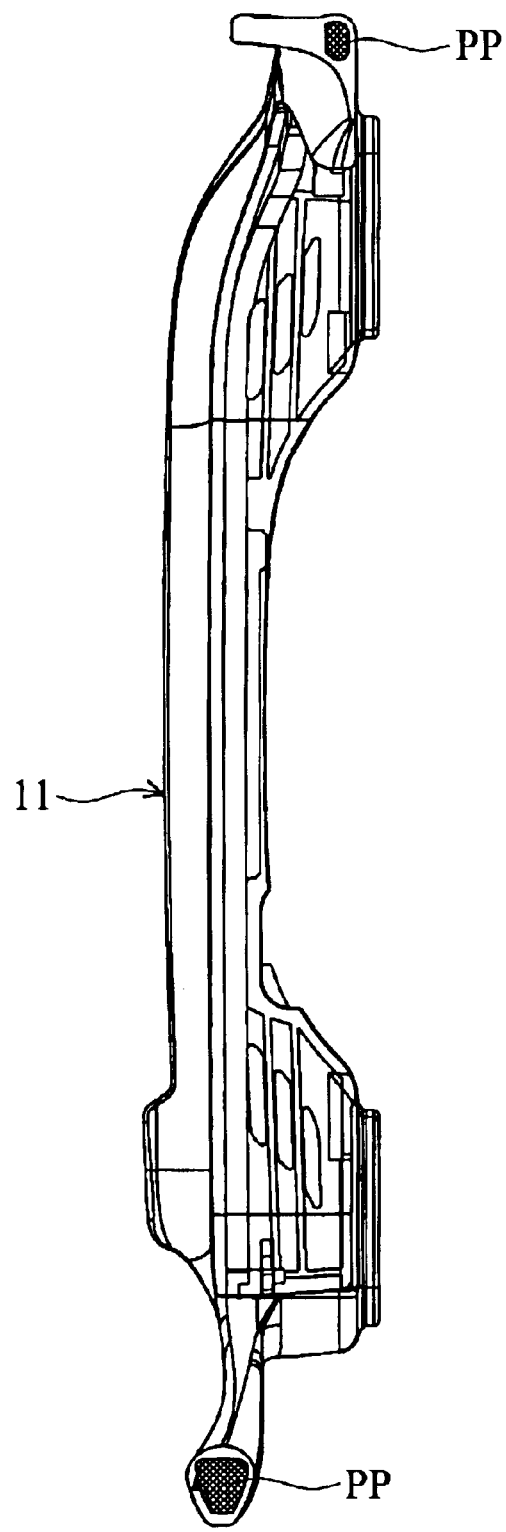
FIG. 3D is a cross section taken along line D–D of FIG. 2.

In addition, as shown in FIG. 3A and FIG. 3C, the main body 11 further comprises an inner vacancy 115 for enhancing shockproof effect of the main body 11.

While the invention has been described by way of examples and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bumper for protecting a portable computer with a casing, comprising:
   a resilient main body surrounding the casing and having a plurality of portions connected to each other and a plurality of connecting parts located between the portions;
   a first reinforcement portion disposed in one of the portions and the adjacent connecting parts;
   a second reinforcement portion disposed in one of the portions; and
   a third reinforcement portion disposed in one of the connecting parts.

2. The bumper as claimed in claim 1, wherein the resilient main body is made of rubber.

3. The bumper as claimed in claim 1, wherein one of the portions of the resilient main body is a handle.

4. The bumper as claimed in claim 1, wherein the first reinforcement portion, second reinforcement portion and third reinforcement portion are all made of polypropylene.

5. The bumper as claimed in claim 1, wherein the first reinforcement portion is inlaid in the portions and the adjacent connecting parts.

6. The bumper as claimed in claim 1, wherein the second reinforcement portion is inlaid in the portions.

7. The bumper as claimed in claim 1, wherein the third reinforcement portion is inlaid in the connecting parts.

8. The bumper as claimed in claim 1, wherein the resilient main body further comprises a fixing portion formed on the portions for fixing the resilient main body to the casing of the portable computer.

9. The bumper as claimed in claim 1, wherein the resilient main body further comprises a groove formed on the portions for engaging the casing of the portable computer.

10. The bumper as claimed in claim 1, wherein the resilient main body further comprises an inner vacancy formed in the portions for enhancing shockproof effect of the resilient main body.

11. A bumper for protecting a portable computer, with a casing, comprising:
    a resilient main body surrounding the casing and having a first portion, a second portion, a third portion and a fourth portion, wherein the first portion is connected to the second portion, the second portion is connected to the third portion, the third portion is connected to the fourth portion, and the fourth portion is connected to the first portion;
    a first reinforcement portion disposed in the first portion, a connecting portion between the first portion and the second portion and a connecting portion between the first portion and the fourth portion;
    a second reinforcement portion disposed in the third portion;
    a third reinforcement portion disposed in a connecting portion between the second portion and the third portion; and
    a fourth reinforcement portion disposed in a connecting portion between the third portion and the fourth portion.

12. The bumper as claimed in claim 11, wherein the resilient main body is made of rubber.

13. The bumper as claimed in claim 11, wherein the first portion of the resilient main body is a handle.

14. The bumper as claimed in claim 11, wherein the first reinforcement portion, second reinforcement portion, third reinforcement portion and fourth reinforcement portion are all made of polypropylene.

15. The bumper as claimed in claim 11, wherein the resilient main body further comprises an inner vacancy formed in the first portion, the second portion, the third portion and the fourth portion for enhancing shockproof effect of the resilient main body.

16. The bumper as claimed in claim 11, wherein the resilient main body further comprises a groove formed on the first portion, the second portion, the third portion and the fourth portion for engaging the casing of the portable computer.

* * * * *